US006260084B1

United States Patent
Wilson et al.

(10) Patent No.: US 6,260,084 B1
(45) Date of Patent: Jul. 10, 2001

(54) MODEM APPARATUS AND METHOD FOR SERIAL COMMAND AND DATA MULTIPLEXING

(75) Inventors: James Y. Wilson, Crystal Lake; Edward B. Endejan, Gurnee; Khalil C. Haddad, Mount Prospect; William C. Pfutzenreuter, Hoffman Estates; Thuraia Albazzaz, Riverside, all of IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/080,484

(22) Filed: May 18, 1998

(51) Int. Cl.⁷ .............................. G06F 9/48; G06F 13/00
(52) U.S. Cl. .................. 710/38; 710/14; 710/51; 710/129; 375/216; 375/220; 375/222; 712/208
(58) Field of Search ................... 710/14, 38, 51, 710/129; 375/219, 220, 222; 712/208

(56) References Cited

U.S. PATENT DOCUMENTS

| | | | |
|---|---|---|---|
| 5,809,070 | * 9/1998 | Krishnan et al. | 375/222 |
| 5,859,993 | * 1/1999 | Snyder | 712/208 |
| 5,949,765 | * 9/1999 | Deadman et al. | 370/271 |
| 6,058,433 | * 5/2000 | Gilbert | 709/250 |
| 6,097,411 | * 8/2000 | Allport | 348/552 |

FOREIGN PATENT DOCUMENTS

404329171 * 11/1992 (JP) .

* cited by examiner

*Primary Examiner*—Thomas Lee
*Assistant Examiner*—Tammara Peyton
(74) *Attorney, Agent, or Firm*—Baniak Pine & Gannon

(57) ABSTRACT

A modem and associated method with both an RS-232 interface and a USB interface connects to a host. The modem detects which of the two interfaces is connected to the host and determines an appropriate data path. For connections to the USB interface, data is routed through a USB processor and over a serial link to the modem processor responsible for modem communications and the transfer of modem data to the POTS. The serial link between the USB processor and the modem processor is used to transfer both modem data and processor communications. A plurality of control lines are used to indicate the type of data being transferred over the serial link. For RS-232 connections, the modem data is transferred to the modem processor. Thus, one modem device may be used for either USB or RS-232 connections.

36 Claims, 4 Drawing Sheets

MODEM APPARATUS AND METHOD FOR SERIAL COMMAND AND DATA MULTIPLEXING

BACKGROUND

This invention relates to a modem and, in particular, a modem for allowing communications with a host using either an RS-232 or a Universal Serial Bus (USB) interface.

Modems allow a host, such as a computer, to transfer data over telephone networks. Typically, the data is transferred to another modem over Plain Old Telephone System (POTS) lines. The receiving modem then transfers the data to another host. Modems connect to a POTS line through an RJ11 jack.

Typically modems connect to a host computer through an RS-232 serial port. As the demands for more connectivity to host computers has grown, the demand for a more versatile connection to a host has also grown. Thus, computers are providing Universal Serial Bus (USB) connections. The USB connections operate pursuant to the USB specification, currently version 1.0. Additional specifications may be used, such as the USB Class Definition for Communication Devices (CDC) or non-USB specifications. As computers or hosts with USB interfaces are created, modems providing USB interfaces may be desired. However, many computers continue to use RS-232 interfaces for modem connections. Thus, a different modem may need to be purchased depending on the type of interface on the host computer.

SUMMARY

The present invention is defined by the following claims, and nothing in this section should be taken as a limitation on those claims. By way of introduction, the preferred embodiment described below includes a method and system for providing modem communications between a host and a telephone system. A modem with both an RS-232 interface and a USB interface connects to the host. The modem detects which of the two interfaces is connected to the host and determines an appropriate data path. For connections to the USB interface, data is routed through a USB processor and over a serial link to the modem processor responsible for modem communications and the transfer of modem data to the POTS line. The serial link between the USB processor and the modem processor is used to transfer both modem data and processor communications. A plurality of control lines are used to indicate the type of data being transferred over the serial link. For RS-232 connections, the modem data is transferred to the modem processor. Thus, one modem device may be used for either USB or RS-232 connections. Further aspects and advantages are discussed below in conjunction with the preferred embodiments.

DETAILED DESCRIPTION OF THE PREFERRED EMBODIMENTS

The preferred embodiments described below are designed to allow transfers of modem data between a telephone system and a host computer. The host may be connected through either a USB interface or an RS-232 interface. The modem responds to and provides data to the host through either of the interfaces.

Figure 1:
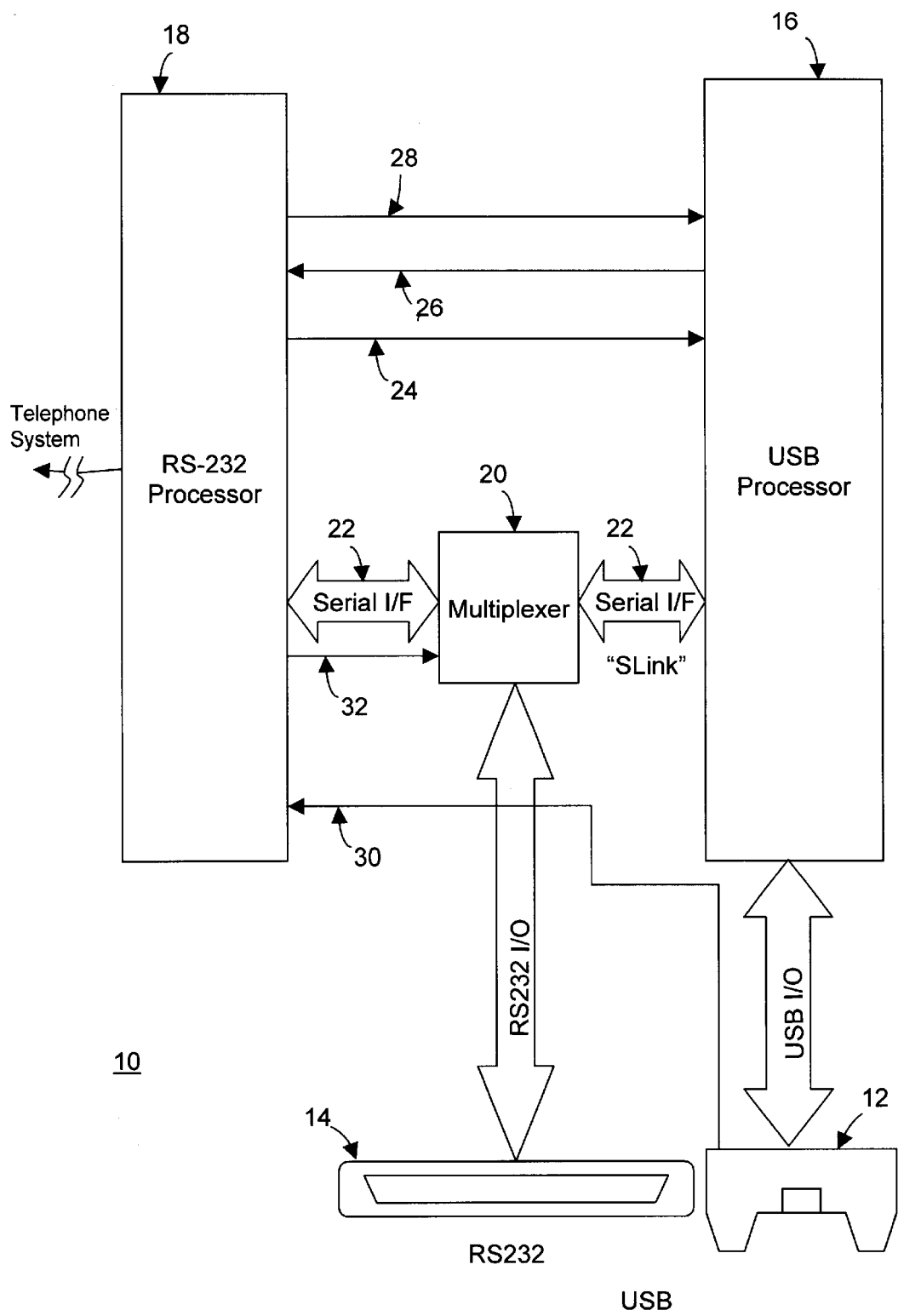
FIG. 1 is a block diagram of one embodiment of an interface portion of a modem.

Referring to FIG. 1, one embodiment of the interface portion of a modem is generally shown at 10. The interface portion 10 includes a USB interface 12, an RS-232 interface 14, a USB processor 16, an RS-232 processor 18, and a multiplexer 20. Other types of interfaces and processors, either standard or non-standard, may be used.

Preferably, the USB interface 12 is a standard USB connector, such as a 4-pin type B USB connector, and connects to the USB processor 16. Preferably, the USB processor 16 is a microcontroller, such as an Intel® 8X930AX USB microcontroller, but other processors may be used. Preferably, the USB processor 16 connects to the RS-232 processor 18 through the multiplexer 20. The RS-232 connector also connects to the RS-232 processor 18 through the multiplexer 20. Preferably, the RS-232 processor 18 is comprised of a digital signal processor, such as a TI TMS320C511-96 and an additional circuitry incorporated into an Application Specific Integrated Circuit (ASIC), but other implementations and processors may be used.

The RS-232 interface 14 is preferably a standard 25-pin RS-232 serial port. As used herein, the interface between the RS-232 processor 18 and the USB processor 16, through the multiplexer 20, is referred to as serial link 22.

Other than the bus connections discussed above, a plurality of control and detection connections are included in the interface portion 10. In the preferred embodiment, a mode indication line 24 and two interrupt lines 26 and 28 connect between the RS-232 processor 18 and the USB processor 16. Interrupt line 26 comprises an interrupt input into the RS-232 processor, and interrupt line 28 comprises an interrupt input into the USB processor 16. A detection line 30 is also provided between the USB interface 12 and the RS-232 processor 18. A multiplexer control line 32 connects from the RS-232 processor 18 to the multiplexer 20. Preferably, the various control lines 24, 26, 28, 30, and 32 comprise one bit binary connections. Additional, fewer or different control lines may be used, including multiple bit buses or control lines.

The interface portion 10 connects through the RS-232 processor 18 to additional modem elements and to a POTS line. Alternatively, communication systems other than a telephone system are used. The interface portion 10 also connects to a host. Either the USB interface 12 or the RS-232 interface 14 or both may be connected to the host.

Preferably, only one interface is active at any given time. Which of the two interfaces 12 or 14 is active is determined by using the detection line 30. Pursuant to the USB specification, one of the lines connected to the USB interface 12 from the host is a power supply, such as a 5-volt supply. If the USB interface 12 is connected to the host, power may be passed to the USB interface 12. The detection line 30 connects to the power line on the USB interface 12. The RS-232 processor 18 detects a connection to the host through the USB interface 12 when voltage is supplied to the detection line 30.

Preferably, if the USB interface 12 is connected to the host, communications to and from the modem are transferred through the USB interface 12 regardless of any RS-232 interface 14 connection. If the USB interface 12 is not connected to the host, then communications to or from the modem are through the RS-232 interface 14.

Depending on which interface 12 or 14 is connected to the host, a data path for transferring modem data is established.

As used herein, modem data comprises data for transfer to or from the telephone system or other communications network. For a host connection to the USB interface 12, the data path includes the USB interface 12, the USB processor 16, the serial link 22, the multiplexer 20, and the RS-232 processor 18. For a host connection to the RS-232 interface 14 and not to the USB interface 12, the data path includes the RS-232 interface 14, the multiplexer 20, and the RS-232 processor 18. Other data paths, including additional, different or fewer devices, or connection to a plurality of interfaces, may be used. To establish the data path, the RS-232 processor 18 controls the multiplexer 20. In response to a signal on the multiplexer control line 32, the multiplexer 20 switches to either transfer of data through the serial link 22 or the RS-232 interface 14.

Preferably, if the data path through the RS-232 interface 14 is in use, detection of a new connection to the USB interface 12 cancels the RS-232 connection. Unplugging or plugging a USB cable into the USB interface 12 terminates any electrical connection to the POTS line and places the modem in a standby state, ready for AT commands.

Figure 2:
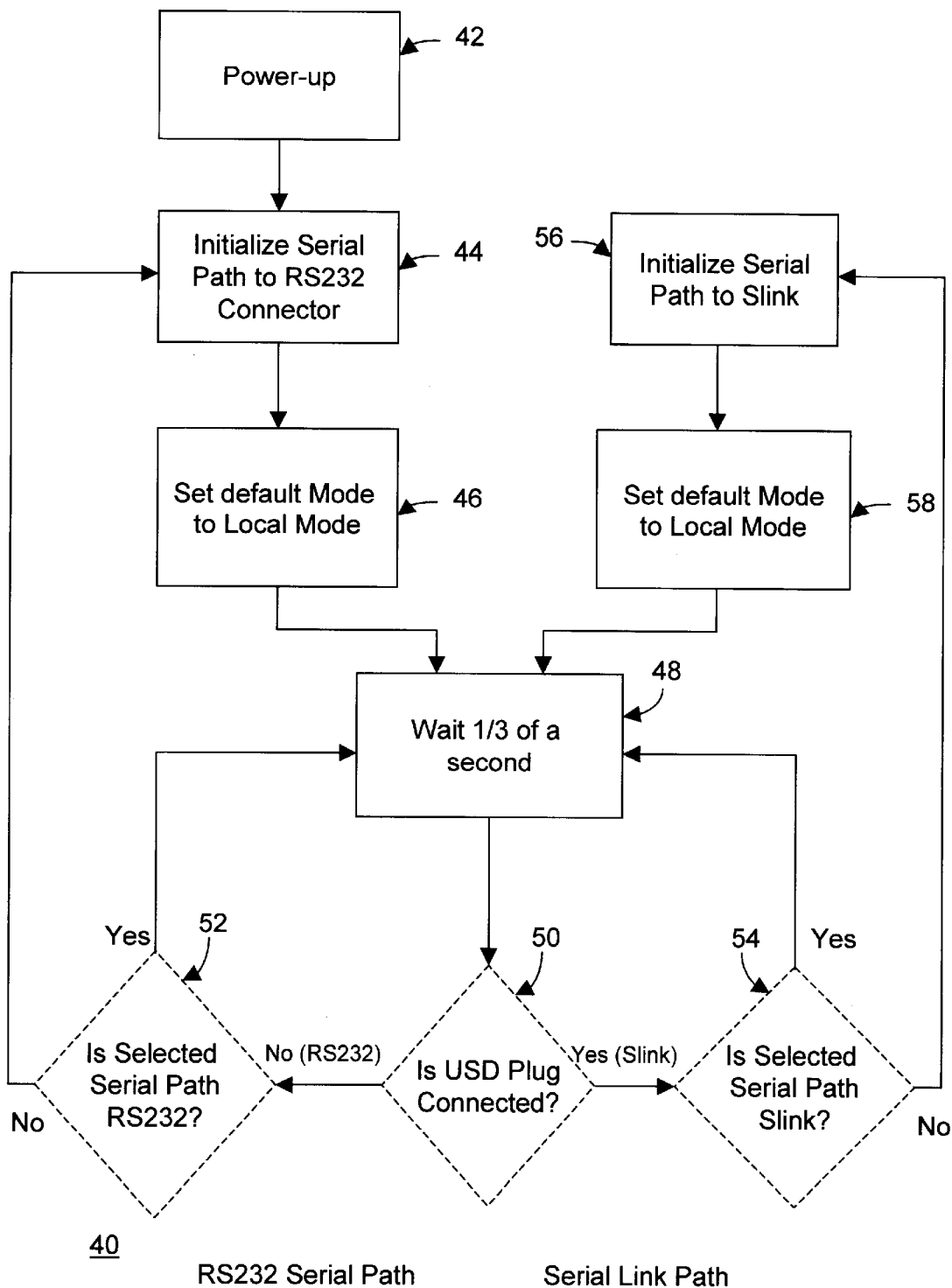
FIG. 2 is a flow chart diagram of one embodiment of a method to detect which of two or more interfaces are connected to a host.

Referring to FIGS. 1 and 2, a flow chart of one embodiment of a method used to determine the appropriate data path is shown generally at 40. Block 42 powers up the modem, and block 44 then initializes the data path through the RS-232 connector. For example, the RS-232 processor 18, using control line 32, switches the multiplexer 20. As discussed below, the mode for the transfers of any data between the USB processor 16 and the RS-232 processor 18 is set for modem data in block 46. After waiting a certain amount of time in block 48, such as one third of a second, the RS-232 processor 18 samples the detection line 30 for a host connection to the USB interface 12 in block 50. If the USB interface 12 is not connected to the host, then block 52 determines whether the selected data path is through the RS-232 interface 14. If the selected data path is through the RS-232 interface 14, then the process returns to block 48. If the selected data path is not through the RS-232 interface 14, then the process is returned to block 44 to initialize the data path through the RS-232 interface 14. If a connection to the USB interface 12 is detected, then block 54 determines whether the serial link 22 and corresponding USB interface 12 is the selected data path. If the serial link 22 is the selected data path, then the process returns to block 48. If the selected data path is not through the serial link 22, then block 56 initializes the serial link data path. For example, the RS-232 processor 18, using control line 32, switches the multiplexer 20 to receive information over the serial link 22. After initialization, block 58 sets the mode of data transfer between the RS-232 processor 18 and the USB processor 16 to the modem data mode as discussed below. Using the process 40, the connection between the interface portion 10 and the host is continually monitored for any changes. Based on any changes, the interface portion 10 is configured appropriately. Other detection and configuration processes, such as using different defaults, may be used.

If the RS-232 interface 14 data path is selected, then modem data and other messaging is transferred between the host and the RS-232 processor 18. The RS-232 processor 18 causes any modem data to be transferred to and from the telephone system through the RS-232 interface 14 and the RS-232 processor 18. The RS-232 processor 18 receives modem data from or provides modem data to the selected data path. The RS-232 processor 18 also performs other normal modem operations such as AT command processing and the transfer of fax, voice or other modem data. The RS-232 processor 18 may perform fewer or additional tasks.

If the selected data path is through the serial link 22 and USB interface 12, then the modem operates as a USB compliant device. In particular, the host provides configuration device management and input/output functions to the interface portion 10. Modem data and processor communications are transferred from the host through the USB interface 12 to the USB processor 16 over two different pipe lines. The processor communications are sent over a default end point as defined in the CDC specification and modem data is sent and received as an octet stream over a bi-directional bulk pipe. Communications with the host are performed pursuant to the USB specification. The interface device 10 responds to commands from the host and provides a series of predefined descriptors indicating the structure or structures of the input/output buses used to communicate with the host.

USB specification defined requests include standard and communication class requests. As used herein, the term request refers to the process by which the host commands the interface portion 10 to perform a particular function or retrieve particular data. Preferably, the USB processor 16 performs the particular function or retrieves the particular data item. For a discussion of the various standard requests, such as Clear Feature, Get Configuration, Get Descriptor, Get Interface, Get Status, Set Address, Set Configuration, Set Feature, and Set Interface, see the USB specification at chapter 9, section 9.4 and subsections thereof. For a list of communication class requests, such as Set Comm Feature, Clear Comm Feature, Get Comm Feature, Get Encapsulated Response, Send Encapsulated Command, UART Set Control Line State, Get Line Coding, Set Line Coding, and Send Break, see the USB CDC specification at section 6.2 and subsections thereof. Preferably, the various communication class requests listed above are processed by the USB processor 16. Additional, different or fewer requests may be supported by the interface portion 10. If a request is received from the host and not supported, the USB processor 16 returns a Stall PID response in a setup or status stage of a control transfer pursuant to chapter 7 of the USB specification.

Also referring to the CDC specification, the USB processor 16 provides notifications to the host in response to a host polling signal. Preferably, the USB processor 16 supports the "Serial State" and "Response Available" notifications discussed in section 6.3.5 of the CDC specification. Other requests and notifications, either pursuant to a specification or designed for a particular implementation or vendor, may be used. For example, various test information and legacy modem control information may be provided. Various legacy data communication applications access universal asynchronous receive/transmit (UART) control lines and settings. In order to provide UART emulation through the USB interface 12, various UART settings information may be provided by the USB processor 16, such as the removal and inserting of framing bits to modify the outgoing or incoming data streams. Operation pursuant to different or additional specifications may be supported.

The USB processor 16 generally processes two types of data: processor communications (various requests and notifications) and modem data (data for transfer to or from the telephone system). The USB processor 16 receives modem data as multiple-byte packets from the host and reformats the modem data into 8-bit data bytes for transfer over the serial link 22 to the RS-232 processor 18. Conversely, the USB processor 16 receives 8-bit bytes from the RS-232 processor 18 and reformats them as multiple byte packets for transfer through the USB interface 12 to the host. For processor communications and since the RS-232 processor 18 provides various modem control and processing, the USB processor 16 may need to communicate with the RS-232 processor 18 to respond to a request, provide a notification or make a request to the host or the RS-232 processor 18. For example, to respond to a USB standard Get Descriptor Request, the USB processor 16 communicates with the RS-232 processor to obtain a UNI-CODE serial number. Preferably, both processor communications and modem data are transferred through the serial link 22. The serial link 22 provides a single serial RS-232 type of pipe line for transporting processor communications and modem data between the USB processor 16 and the RS-232 processor 18.

In order to distinguish between processor communications and modem data, the interface portion 10 operates pursuant to two or more modes, such as local and message modes. In the local mode, modem data, such as AT commands, fax, voice, and other data, is transferred over the serial link 22. In the message mode, processor communications are transferred over the serial link 22. For example, various USB commands, control information to or from the modem (i.e. even or odd parity, ring or break status), general information to or from the modem (i.e. serial number of modem) and other information discussed below is transferred. Additional modes may be provided to further distinguish various types of data.

In one embodiment, the RS-232 processor 18 controls the mode (i.e. the RS-232 processor 18 is the master and the USB processor 16 is the slave). Alternatively, the USB 16 is the master and the RS-232 processor 18 is the slave. As yet another alternative, a dual processor control approach may be used.

In the preferred embodiment, the RS-232 processor 18 indicates the current mode by outputting a control signal on the mode indication line 24. The USB processor 16 receives the output on the mode indication line 24. Preferably, the control signal is a one-bit signal corresponding to the two possible modes. For example, if the signal on the mode indication line 24 is a 1, then the serial link 22 is used in a message mode. If the output on the mode indication line 24 is a 0, then the serial link 22 is used pursuant to the local mode. Thus, processor communications and modem data are multiplexed over the same serial link 22.

Preferably, the interface portion 10 defaults to being operated in the local mode, whether there is an active telephone connection or an off-line data state. For example and referring to FIG. 2, blocks 46 and 58 correspond to setting the appropriate default mode. Alternatively, a different default mode is used.

Figure 3:
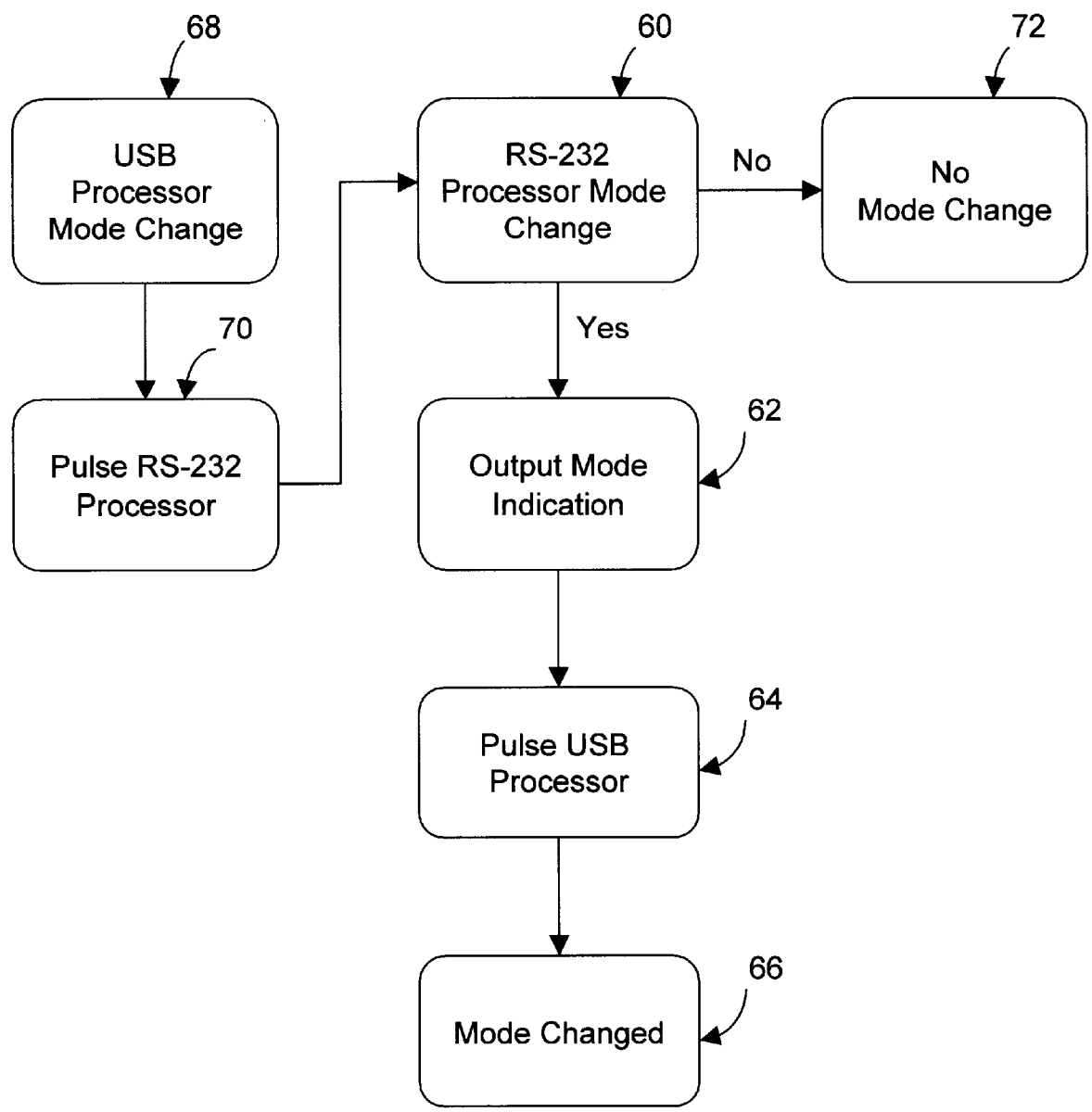
FIG. 3 is a flow chart diagram of one embodiment of a method for changing the mode or type of data transferred between two interface processors.

In order to exchange processor communications between the RS-232 processor 18 and the USB processor 16, the interface portion 10 is configured to operate in the message mode. Referring now to FIGS. 1 and 3, one embodiment for switching modes is shown. Preferably, the RS-232 processor 18 controls the mode and any changes in mode. As shown in block 60, the RS-232 processor 18 requests a mode change. The RS-232 processor 18 outputs a signal corresponding to the new mode in block 62 on the mode indication line 24. For example, the output signal is changed from a 0 value to a 1 value to indicate a message mode.

In block 64, the RS-232 processor 18 pulses the interrupt line 28 input into the USB processor 16. Various pulses may be used, such as setting the interrupt high, then low, and then high again. Since the USB processor 16 is a slave processor, the request for a change of mode is accepted as represented in block 66. After switching to the message mode, the RS-232 processor 18 transfers the processor communication information, waits for a response if appropriate and then initiates another mode change to the local mode.

Since the USB processor 16 is the slave to the RS-232 processor 18, the USB processor 16 requests that the RS-232 processor 18 change the mode as shown in block 68. To communicate the request, the USB processor 16 outputs a pulse on the interrupt line 26 input into the RS-232 processor 18 in block 70. Various pulses may be used, such as a single low pulse. To change the mode, the RS-232 processor responds as discussed above. Alternatively, the RS-232 processor 18 does not respond or maintains the current signal on the mode indication line 24 corresponding to the local mode as shown in block 72. The USB processor 16 may repeat the request or may consider the response terminated. For example, the request is made three times before considering a non-response as permanent. If the RS-232 processor 18 receives a request from the USB processor 16 to change modes at substantially the same time as the RS-232 processor 18 is initiating a mode change, one request is buffered.

If the RS-232 processor 18 changes to the message mode, the USB processor 16 sends a message mode processor communication through the serial link 22. The RS-232 processor may respond with further processor communications. Once processor communications are complete, the RS-232 processor 18 initiates a mode change back to the local mode as described above.

The processor communications may comprise any of various messages formatted in any of various groupings. Preferably, the processor communication format includes a header and the message data. For example, the header includes two bytes of information, one identifying the message type and a second identifying the length of the message data. The types of message data correspond to the source and destination of the message. For example, the USB processor 16 sends messages to the RS-232 processor 18, such as Request Code Load, Notify Code Load Status, Request RS-232 Processor Information, Request Reset Modem, Perform Send Break, Request Line Coding, Request Encapsulated Command, and Request Encapsulated Response messages. The RS-232 processor 18 sends various messages to the USB processor 16, such as Request USB Processor Information, Acknowledge Code Load, Acknowledge Code Start, Perform USB Processor Reset, End Of Message, More Message, USB Processor Statistics, Acknowledge Reset Modem, Notify UART Status, and Acknowledge Line Coding. Generally, the messages described above preceded by the word request, correspond to associated messages preceded by the word acknowledge. Fewer, more or different messages and message schemes may be used. Generally, the various messages correspond to information for USB specification messages and CDC specification messages.

Using the modes and messages described above, the interface portion 10 may process a modem AT command. For example, a host is connected to the USB interface 12. The host issues a Send Encapsulated Command request to the USB processor 16. The USB processor 16 parses the request to obtain the command, such as ATr. The USB processor 16 marks an internal variable indicating a pending modem command. The USB processor 16 determines the current mode of the interface portion 10. If the interface portion 10 is in the local mode, the USB processor 16 requests a change to the message mode and awaits an acknowledgment from the RS-232 processor 18. After the interface portion 10 is configured to the message mode, the USB processor 16 transfers the Request Encapsulated Command message to the RS-232 processor 18 with the command AT\r in the data field and buffers all data in the Request Encapsulated Response message(s) until the End of Message command is received. The USB processor 16 parses the responses to obtain the modem response \r\nOK\r\n and copies the string to an internal buffer. After sending the "End of Message", the RS-232 processor 18 initiates a mode change to the local mode. The USB processor 16 provides a Response Available notification to the host. The host responds by sending a Get Encapsulated Response request. The USB processor 16 provides the buffered \r\nOK\r\n string. The variable indicating the pending command is set to indicate completion. Thus, the USB processor 16 is ready to respond to any subsequent request from the host or the RS-232 processor 18.

Figure 4:
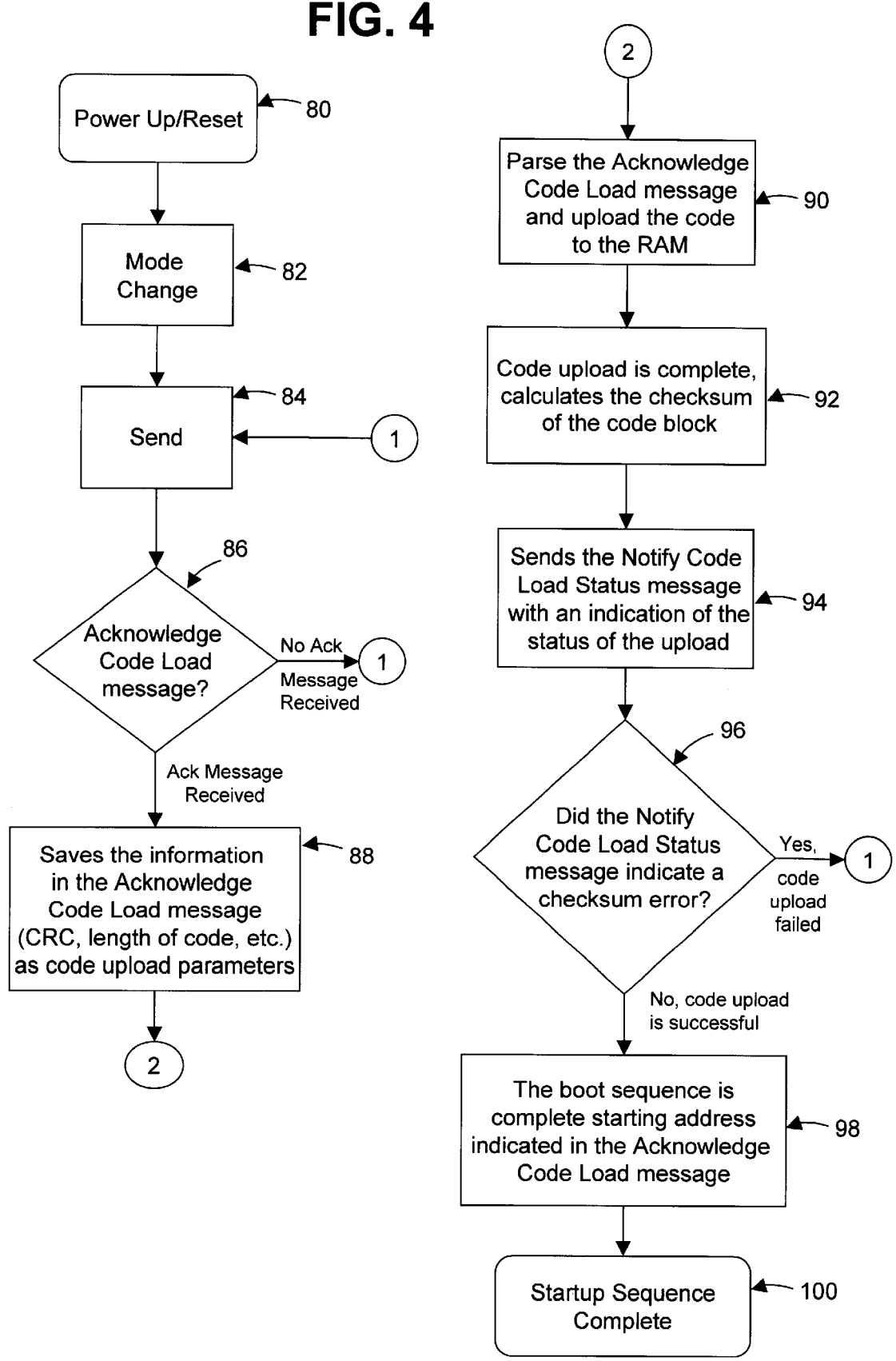
FIG. 4 is a flow chart diagram of one embodiment for downloading operating code to an interface processor.

Referring to FIGS. 1 and 4, another example of one embodiment for transferring processor communications and modem data over the serial link 22 is shown. This example corresponds to downloading operating code for the USB processor 16. After powering up or resetting the modem in block 80, the USB processor 16 requests a mode change in block 82. After the mode is changed to the message mode, the USB processor 16 sends a Request Code Load message to the RS-232 processor 18 in block 84. The RS-232 processor 18 processes the request and either acknowledges or does not acknowledge the request in block 86. If, after a certain amount of time passes, no acknowledgment is received, the processing of the USB processor 16 returns to block 84. If an acknowledgment is received by the USB processor 16, the USB processor 16 saves the Acknowledged Code Load message as code upload parameters in block 88. In block 90, the USB processor 16 parses the Acknowledged Code Load message and uploads the appropriate code to the RAM memory or another memory of the USB processor 16. After completion of uploading the code, the USB processor 16 calculates the checksum of the code in block 92. In block 94, the USB processor 16 sends a Notify Code Load Status message to the RS-232 processor 18 indicating the status of the upload. As represented by block 96, if the Notify Code Load Status message indicated a checksum error, then the code load failed and the processing is returned to block 84. If there was no code load failure, then the boot sequence is complete, and the USB processor 16 uses a starting address indicated in the Acknowledged Code Load message to begin processing in block 98. In block 100, the RS-232 processor 18 returns the mode to the local mode in response to the Notify Code Load Status message indicating a successful upload. Thus, operating code for controlling the USB processor 16 is stored in memory. Pursuant to the operating code, USB processor 16 transfers or receives additional processor communications and modem data over the serial link 22 as discussed above.

Through various mode changes and detection of connection to either the RS-232 interface 14 or the USB interface 12, the modem discussed above may be used with various hosts. Thus, a user does not need to buy a new modem when changing from a host with RS-232 ports to a host with USB ports.

While the invention has been described above by reference to various embodiments, it will be understood that many changes and modifications can be made without departing from the scope of the invention. For example, different means for detecting connection to a particular interface may be used. Different mode control means and schemes may be used. Furthermore, additional or different messages for processor communications may be used.

It is therefore intended that the foregoing detailed description be understood as an illustration of the presently preferred embodiments of the invention and not as a definition of the invention. It is only the following claims, including all equivalents, which are intended to define the scope of the invention.

What is claimed is:

1. An apparatus for providing modem communications between a host and a telephone system, the apparatus comprising:
   a modem operatively connected between the host and the telephone system the modem including an RS-232 interface and a Universal Serial Bus (USB) interface;
   a first processor operatively connected to the RS-232 interface;
   a second processor operatively connected to the USB interface; and
   a serial link operatively connected to the first and second processors to allow data to be transferred between the first processor and a device selected from the group consisting of: the second processor and the RS-232 interface.

2. The apparatus of claim 1 further comprising a mode indication line operatively connected to the first and second processor.

3. The apparatus of claim 2 wherein the first processor controls the mode indication line.

4. The apparatus of claim 2 wherein the second processor comprises a second processor interrupt input operatively connected to the first processor.

5. The apparatus of claim 4 wherein the first processor indicates a mode change by an output on the mode indication line and pulsing the second processor interrupt input.

6. The apparatus of claim 5 wherein the second processor indicates a requested mode change by pulsing a first processor interrupt input.

7. The apparatus of claim 6 wherein the first processor is responsive to the requested mode change by outputting a signal on the mode indication line and pulsing the second processor interrupt input.

8. The apparatus of claim 1 wherein the first processor comprises a first processor interrupt input operatively connected to the second processor.

9. The apparatus of claim 1 further comprising a multiplexer operatively connected to the serial link and the first processor.

10. The apparatus of claim 9 wherein the first processor is operative to control the multiplexer.

11. The apparatus of claim 1 further comprising a detection line operatively connected to the USB interface and the first processor.

12. The apparatus of claim 11 wherein the first processor is operative to control a multiplexer in response to a signal on the detection line.

13. The apparatus of claim 1 wherein the mode indication line corresponds to a mode selected from the group consisting of: a message mode and a local mode.

14. The apparatus of claim 13 wherein the message mode corresponds to transfers of processor communications on the serial link.

15. The apparatus of claim 13 wherein the local mode corresponds to transfers of modem data on the serial link.

16. A method for providing modem communications between a host and a telephone system, the method comprising the steps of:
   a) providing a modem comprising an RS-232 interface and a Universal Serial Bus (USB) interface;

b) controlling a serial link operatively connected between a first processor operatively connected to the RS-232 interface and a second processor operatively connected to the USB interface; and c) transferring data between the first processor and a device selected from the group consisting of: the second processor and the RS-232 interface in response to step (b).

17. The method of claim 16:

wherein step (c) comprises transferring data between the first processor and the second processor; and further comprising step (d) of communicating between the first and second processors a mode associated with the data.

18. The method of claim 17 wherein step (d) comprises controlling the mode with the first processor.

19. The method of claim 17 wherein step (d) comprises changing the mode.

20. The method of claim 19 wherein step (d) comprises:

(d1) outputting a mode indication on a mode line; and (d2) pulsing with the first processor a second processor interrupt.

21. The method of claim 20 further comprising step (e) of requesting a mode change with the second processor.

22. The method of claim 21 wherein:

step (e) comprises pulsing with the second processor a first processor interrupt; and step (d) comprises outputting a signal on the mode indication line and pulsing the second processor interrupt in response to step (e).

23. The method of claim 16 wherein step (b) comprises controlling a multiplexer operatively connected to the serial link and the first processor.

24. The method of claim 16 further comprising step (d) of detecting a connection from the host to the USB interface.

25. The method of claim 24 wherein step (c) comprises selecting the device in response to step (d).

26. The method of claim 17 wherein step (d) comprises indicating the mode selected from the group consisting of: a message mode and a local mode.

27. The method of claim 26:

wherein step (d) comprises indicating the message mode; and wherein step (c) comprises transferring processor communications on the serial link.

28. The method of claim 26:

wherein step (d) comprises indicating the local mode; and wherein step (c) comprises transferring modem data on the serial link.

29. A method for providing modem communications with a modem comprising an RS-232 interface and a Universal Serial Bus (USB) interface, the method comprising the steps of:

a) detecting a connection to the USB interface with a first processor;

b) selecting a data path from the group consisting of: (1) a second processor and the USB interface and (2) the RS-232 interface in response to step (a); and c) transferring data between the first processor and the data path in response to step (b).

30. The method of claim 29:

wherein step (b) comprises selecting the second processor and the USB interface; and further comprising step (d) of communicating between the first and second processors a mode associated with the data, the mode selected from the group consisting of: a message mode and a local mode.

31. The method of claim 29 wherein step (a) comprises detecting a voltage at the USB interface.

32. The method of claim 29 wherein step (c) comprises controlling a serial link operatively connected between the first processor operatively connected to the RS-232 interface and the second processor operatively connected to the USB interface.

33. An apparatus for providing modem communications between a host and a telephone system, the apparatus comprising:

a modem operatively connected between the host and the telephone system, the modem including a serial port connector and a Universal Serial Bus (USB) connector;

a first processor operatively connected to the serial port connector;

a second processor operatively connected to the USB connector; and a serial link operatively connected to the first and second processors to allow data to be transferred between the first processor and a device selected from the group consisting of: the second processor and the serial port connector.

34. The apparatus of claim 33 wherein the serial port connector is a RS-232 serial port.

35. The apparatus of claim 33 wherein the serial port connector is a 25-pin RS-232 serial port.

36. The apparatus of claim 33 wherein the USB connector is a 4-pin type B USB connector.

\* \* \* \* \*